(12) United States Patent
Moussa

(10) Patent No.: US 11,602,892 B2
(45) Date of Patent: Mar. 14, 2023

(54) THREE DIMENSIONAL PRINTING MATERIALS, SYSTEMS, AND METHODS

(71) Applicant: 3D Systems, Inc., Rock Hill, SC (US)

(72) Inventor: Khalil Moussa, Chapel Hill, NC (US)

(73) Assignee: 3D SYSTEMS, INC., Rock Hill, SC (US)

( * ) Notice: Subject to any disclaimer, the term of this patent is extended or adjusted under 35 U.S.C. 154(b) by 1487 days.

(21) Appl. No.: 15/105,186

(22) PCT Filed: Dec. 22, 2014

(86) PCT No.: PCT/US2014/071908
§ 371 (c)(1),
(2) Date: Jun. 16, 2016

(87) PCT Pub. No.: WO2015/100243
PCT Pub. Date: Jul. 2, 2015

(65) Prior Publication Data
US 2016/0318250 A1    Nov. 3, 2016

Related U.S. Application Data

(60) Provisional application No. 61/919,844, filed on Dec. 23, 2013.

(51) Int. Cl.
  *B29C 64/165* (2017.01)
  *B29C 64/153* (2017.01)
  (Continued)

(52) U.S. Cl.
  CPC .......... *B29C 64/165* (2017.08); *B29C 64/141* (2017.08); *B29C 64/153* (2017.08);
  (Continued)

(58) Field of Classification Search
  CPC .................................................... B29C 64/165
  See application file for complete search history.

(56) References Cited

U.S. PATENT DOCUMENTS 4,263,372 A * 4/1981 Emmons ............. C04B 24/2641
                                                     264/299
5,380,179 A * 1/1995 Nishimura ............ B22F 1/0059
                                                     106/285
(Continued)

FOREIGN PATENT DOCUMENTS

DE    102007026006 A1    4/2008
WO    2005/113219 A1    12/2005
WO    2008/073297 A2     6/2008

OTHER PUBLICATIONS

Plotnichenko, Hydroxyl Groups in high-purity silica glass, Journal of Non-Crystalline Solids, Jan. 2000 (Year: 2000).*

(Continued)

*Primary Examiner* — Armand Melendez
(74) *Attorney, Agent, or Firm* — John P. Zimmer; Nexsen Pruet, PLLC

(57) ABSTRACT

A method of printing a three dimensional article is provided wherein particles are bonded together with chemical bonds having a bond strength of at least 10 kJ/mol. In one aspect, kits for three dimensional printing are described herein. In some embodiments, a kit described herein comprises a substantially dry particulate material (20) comprising an insoluble filler having a first functional group on the surface of the insoluble filler; and a fluid binder material (26) comprising a multifunctional linker having a second functional group, wherein the insoluble filler is insoluble in the fluid binder material and wherein the first functional group and the second functional group can react with one another to form a covalent bond between the insoluble filler and the multi functional linker.

15 Claims, 3 Drawing Sheets

(51) Int. Cl.
*B29C 64/141* (2017.01)
*B33Y 70/10* (2020.01)
*B33Y 10/00* (2015.01)
 B29K 105/16 (2006.01)
 B29K 105/00 (2006.01)

(52) U.S. Cl.
 CPC .............. *B33Y 10/00* (2014.12); *B33Y 70/10* (2020.01); *B29K 2105/16* (2013.01); *B29K 2105/251* (2013.01)

(56) References Cited

U.S. PATENT DOCUMENTS

| | | | | |
|---|---|---|---|---|
| 2003/0094734 | A1* | 5/2003 | Deckard | B29C 70/54 264/425 |
| 2003/0190472 | A1* | 10/2003 | Moussa | C08G 64/42 428/403 |
| 2005/0080191 | A1 | 4/2005 | Kramer et al. | |

OTHER PUBLICATIONS

Arkles, Barry, Silane Coupling Agents, 2006, Gelect Inc (Year: 2006).*

Liu, X.M. and Thomason, J.L. and Jones, F.R.; (2009) The concentration of hydroxyl groups on glass surfaces and their effect on the structure of silane deposits. In: Silanes and Other Coupling Agents. Brill Academic Publishers. (Year: 2009).*

International Search Report and Written Opinion issued in corresponding International Application No. PCT/US2014/071908 dated Jun. 3, 2015.

* cited by examiner

THREE DIMENSIONAL PRINTING MATERIALS, SYSTEMS, AND METHODS

CROSS REFERENCE TO RELATED APPLICATIONS

This application is a U.S. national stage application under 35 U.S.C. § 371 of International Application No. PCT/US2014/071908, filed Dec. 22, 2014, which claims priority pursuant to 35 U.S.C. § 119 to U.S. Provisional Patent Application Ser. No. 61/919,844, filed on Dec. 23, 2013, each of which is hereby incorporated by reference in its entirety.

FIELD

This invention relates generally to rapid prototyping techniques and, more particularly, to three dimensional printing materials, systems, and methods using a particulate material and a liquid binder material.

BACKGROUND

The field of rapid prototyping involves the production of prototype articles, small quantities of functional parts, and molds for metal casting directly from computer-generated design data. Two well known methods for rapid prototyping include a selective laser sintering process and a process using a liquid binder and a bed of particulate material. Both of these methods use layering techniques to build three dimensional articles. Specifically, these methods form successive thin cross-sections of the desired article. The individual cross-sections are formed by bonding together adjacent grains or particles of a granular or particulate material on a generally planar surface of a bed of the granular material. Each layer is bonded to a previously formed layer at the same time as the grains of each layer are bonded together to form the desired three dimensional cross-section of the article. The laser sintering and liquid binder techniques are advantageous because they create parts directly from computer-generated design data and can produce parts having complex geometries. Moreover, such printing may be quicker and less expensive than machining of prototype parts or production of cast or molded parts by conventional "hard" or "soft" tooling techniques, which can take from a few weeks to several months to complete, depending on the complexity of the item.

However, some three dimensional printing techniques using a liquid binder cannot provide printed articles having sufficiently high strength for some applications. Further, some liquid binder techniques require the use of relatively large amounts of liquid binder and/or can be carried out using only a limited number of liquid binder materials. Therefore, there exists a need for three dimensional printing materials, systems, and methods that can provide printed articles having high strength while using less binder material.

SUMMARY

In one aspect, material systems for three dimensional printing are described herein which, in some embodiments, may provide one or more advantages over some previous material systems. For example, in some cases, a material system described herein can be used to provide printed articles having superior mechanical properties compared to some previous printed articles. Moreover, in some instances, a material system described herein can provide printed articles having tunable mechanical properties.

In some embodiments, a material system described herein is provided as a kit. A material system or kit for three dimensional printing described herein, in some embodiments, comprises a substantially dry particulate material that includes an insoluble filler. In some cases, the particulate material further comprises a soluble filler, a pigment, and/or a catalyst such as a transition metal catalyst. Moreover, in some embodiments, a material system described herein further comprises a fluid binder material. The fluid binder material, in some cases, can comprise a multifunctional linker. In addition, the fluid binder material, in some embodiments, further comprises a surfactant and/or an ethyleneically unsaturated monomer or oligomer such as a (meth)acrylate monomer or oligomer.

Further, in some embodiments, the particulate material of a system or kit described herein comprises a first functional group on the surface of the insoluble filler. The soluble filler, when present, can also comprise a first functional group. Moreover, in some cases, the multifunctional linker of the fluid binder material comprises a second functional group, and the first and second functional groups can react with one another to form a covalent bond. The first functional group of the insoluble filler and/or the soluble filler, in some embodiments, comprises a vinyl, (meth)acrylate, hydroxyl, amine, or amide group. In other instances, the first functional group comprises a carbon radical, singlet oxygen species, or peroxide. The second functional group, in some cases, comprises a glycidyl, epoxide, vinyl, or (meth)acrylate group. In addition, in some embodiments, the multifunctional linker of the fluid binder material further comprises a third functional group that differs from the second functional group, the third functional group being self-curing.

The particulate material and fluid binder material of a system described herein can be suitable for use in three dimensional printing to form an article having a plurality of layers, the layers including a reaction product of the particulate material and the fluid binder material.

In another aspect, methods of printing a three dimensional article are described herein which, in some cases, may provide one or more advantages over some prior methods. For example, in some embodiments, a method described herein can provide printed articles having superior mechanical properties. Further, in some cases, such articles can be provided using less fluid binder material than used in other methods. Additionally, methods described herein, in some instances, can provide printed articles having tunable properties, wherein the properties can be tuned based on the amount of fluid binder material used and/or the activation or deactivation of a chemical bonding mechanism.

A method of printing a three dimensional article described herein, in some embodiments, comprises providing a substantially dry particulate material including a plurality of adjacent particles, the particulate material comprising an insoluble filler; and applying a fluid binder material to at least some of the plurality of particles in an amount sufficient to bond the particles together to define a cross-sectional portion of the article, wherein the insoluble filler is insoluble in the fluid binder material and wherein the particles are bonded together with chemical bonds having a bond strength of at least about 10 kJ/mol. In some cases, the particles are bonded together with chemical bonds having a bond strength of at least about 50 kJ/mol, at least about 100 kJ/mol, or at least about 200 kJ/mol. In some embodiments, one or more covalent bonds are formed between the particles.

Additionally, in some cases, a method described herein further comprises forming reactive sites on the surface of the particles prior to or simultaneously with applying the fluid binder material to the particles. Such reactive sites, in some instances, can be formed by treating the particles with a high energy activation source, such as an electron beam, a plasma, or ozone. Thus, the reactive sites, in some cases, can comprise one or more of carbon radicals, singlet oxygen species, and peroxides.

Moreover, in some embodiments, a method described herein further comprises reacting the reactive sites on the surface of the particles with one or more chemical species comprising a first functional group to provide functionalized particles comprising the first functional group. In addition, in some such embodiments, the fluid binder material comprises a multifunctional linker having a second functional group and the particles are bonded together by reacting the first functional group of the particles with the second functional group of the multifunctional linker. Alternatively, in other cases, functionalization of the particles is not carried out and the fluid binder material does not necessarily comprise a multifunctional linker. In some such instances, the reactive sites on the surface of the particles can be used to form hydrogen bonds or other non-covalent bonds with the fluid binder material.

Additionally, in some embodiments of methods described herein, the formation of reactive sites on the surface of the particles may not necessary. Instead, the insoluble filler of the particulate material may have a first functional group on the surface of the insoluble filler, the fluid binder material may comprise a multifunctional linker having a second functional group, and the covalent bonds may be formed by reacting the first functional group with the second functional group. Moreover, in other instances, a soluble filler of the particulate material comprises a first functional group that can react with the second functional group of the multifunctional linker of the fluid binder material to form one or more covalent bonds. In addition, it is also possible for both the insoluble filler and the soluble filler of a particulate material described herein to comprise a functional group that can react with a functional group of the multifunctional linker.

Further, methods described herein, in some embodiments, use a small amount of fluid binder material. For example, in some cases, less than about 15% by weight or less than about 10% by weight fluid binder material is used, based on the total weight of the fluid binder material and the particulate material.

In another aspect, printed three dimensional articles are described herein which, in some embodiments, may exhibit one or more advantages over some prior articles. For example, in some cases, a three dimensional article described herein has superior mechanical properties, such as a superior flexural strength at break, compared to some other articles. Moreover, in some instances, the mechanical properties of an article described herein are provided primarily by the mechanical properties of the particulate material used to form the article, as opposed to the mechanical properties of the fluid binder material used to form the article.

A printed three dimensional article described herein, in some embodiments, comprises a particulate material phase including a plurality of particles; and a binder material phase in contact with the particulate material phase, wherein the particles of the particulate material phase are bonded together with chemical bonds having a bond strength of at least about 10 kJ/mol. In some cases, the particles are bonded together with chemical bonds having a bond strength of at least about 50 kJ/mol, at least about 100 kJ/mol, or at least about 200 kJ/mol. In some embodiments, the particles are covalently bonded to one another, including through one or more covalent bonds between the particles and a multifunctional linker of the binder material phase. Moreover, in some cases, the binder material phase of the article is a non-continuous phase dispersed throughout the particulate material phase. Alternatively, in other instances, the binder material phase is a continuous phase.

These and other embodiments are described in more detail in the detailed description which follows.

DETAILED DESCRIPTION

Embodiments described herein can be understood more readily by reference to the following detailed description, examples, and figures. Elements, apparatus, and methods described herein, however, are not limited to the specific embodiments presented in the detailed description, examples, and figures. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

I. General Three Dimensional Printing Process

A general three dimensional printing process according to some embodiments described herein will now be described with reference to the figures. It is to be understood that this general process may be used with various material systems and methods described herein, as further described hereinbelow.

Figure 1:
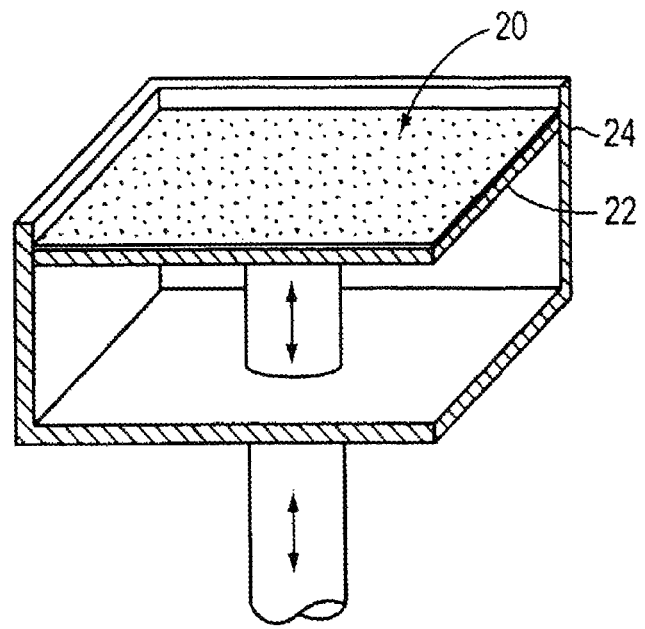
FIG. 1 is a schematic view of a first layer of particulate material deposited onto a movable surface of a container on which an article described herein is to be built, before any fluid binder material has been delivered.

Referring to FIG. 1, a layer or film of a particulate material 20, i.e., an essentially dry, and free-flowing powder, is applied on a linearly movable surface 22 of a container 24. The layer or film of particulate material 20 may be formed in any suitable manner, for example using a counter-roller. The particulate material 20 applied to the surface includes an insoluble filler material. The particulate material 20 may also include a soluble filler material, a pigment, a catalyst, and/or a processing aid material.

Figure 2:
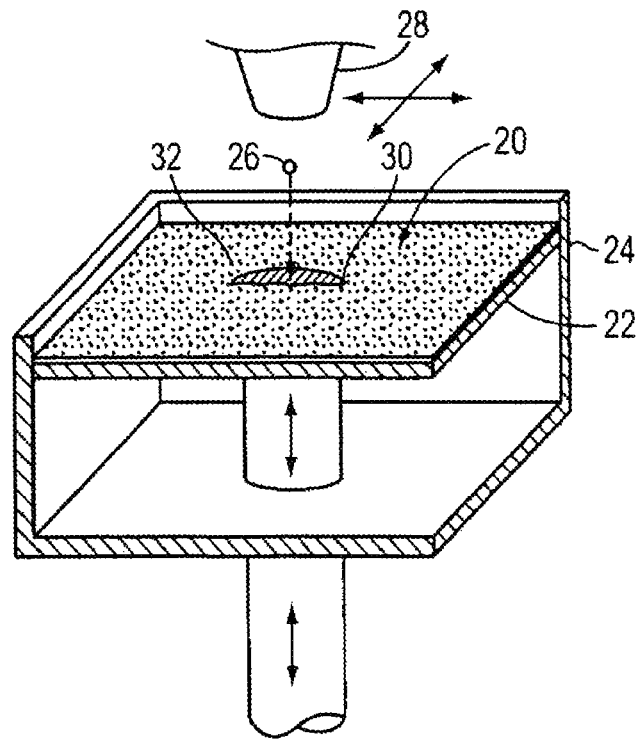
FIG. 2 is a schematic view of an inkjet nozzle delivering a fluid binder material to a portion of the layer of particulate material of FIG. 1 in a predetermined pattern.

Referring to FIG. 2, an ink-jet style nozzle 28 delivers a fluid binder material 26 to at least a portion 30 of the layer or film of the particulate material 20 in a two-dimensional pattern. In some embodiments, the fluid binder material 26 delivered to the particulate material 20 can include a multifunctional linker. The fluid binder material, in some embodiments, may also include a surfactant and/or an ethyleneically unsaturated monomer or oligomer such as a (meth)acrylate monomer or oligomer. The fluid binder material may also include a catalyst such as an organic hydroperoxide or a photoinitiator or an accelerator. According to the printing method, the fluid binder material 26 is delivered to the layer or film of particulate material 20 in any desired or predetermined two-dimensional pattern (circular, in the figures, for purposes of illustration only), using any convenient mechanism, such as a drop-on-demand (DOD) printhead driven by software in accordance with article model data from a computer-assisted-design (CAD) system.

In some embodiments, the first portion 30 of the particulate material reacts with a component of the fluid binder material 26, such as a multifunctional linker, to form one or more relatively strong chemical bonds between the particulate material and the fluid binder material, such as one or more covalent chemical bonds. In addition, it is also possible for contact between the first portion 30 and the fluid binder material 26 to cause the fluid binder material to "activate" or begin to "self-cure" or polymerize into a solid. The reaction between the first portion 30 and the fluid binder material 26 and/or the polymerization of the fluid binder material 26 can cause adjacent particles in the particulate material to adhere to one another to form a conglomerate of the particulate material 20 and the fluid binder material 26. As illustrated in FIG. 1, the conglomerate defines an essentially solid circular layer that becomes a cross-sectional portion of an intermediate article 38 as shown, for instance, in FIGS. 3 and 4.

"Activating," for reference purposes herein, refers to changing the chemical potential of the fluid binder material 26 from an essentially stable or low-potential state to a relatively reactive or high-potential state. Thus, "activation" can comprise the decomposition of an initiator such as an organic hydroperoxide in the fluid binder material 26 once the fluid binder material 26 is in contact with the first portion 30 or a component of the first portion 30, such as a transition metal catalyst present in the particulate material 20. Similarly, when a photoinitiator is present in the fluid binder material 26, "activation" can comprise the decomposition of the photoinitiator in the fluid binder material 26 once the fluid binder material 26 is in contact with the first portion 30, with or without the presence of activating or initiating electromagnetic radiation (not shown), such as UV radiation or other radiation capable of generating a free radical or other decomposition product in the photoinitiator. "Self-curing," for reference purposes herein, refers to the polymerization of a material with itself, such as the polymerization of a (meth)acrylate-containing component of the fluid binder material to form a poly(meth)acrylate.

In some embodiments, when the fluid binder material 26 initially comes into contact with the particulate material 20, the fluid binder material 26 immediately flows outwardly (on a microscopic scale) from the point of impact by capillary suction. If the particulate material 20 includes a soluble filler, the flow of the fluid binder material 26 can dissolve the soluble filler within a specific time period, such as 30 seconds to one minute. In some embodiments described herein, a typical droplet of fluid binder material has a volume of about 50 picoliters (pL) and spreads to a diameter of about 100 micrometers (μm) after coming into contact with the particulate material. As the fluid binder material dissolves the soluble filler, the fluid viscosity of the binder material increases dramatically, arresting further migration of the fluid binder material from the initial point of impact. Within a few minutes, the fluid binder material with soluble filler dissolved therein flows and adheres to and/or reacts with the particulate material in a manner described hereinabove, forming covalent bonds between particles of the particulate material and/or between the fluid binder material and particles of the particulate material. It is also possible for the fluid binder material to react with the soluble filler to form covalent bonds between the soluble filler and the fluid binder material, such as when the soluble filler comprises a first functional group described herein. The fluid binder material is capable of bonding together an amount of the particulate material that is at least several times the mass of a droplet of the fluid binder material. In some cases, the fluid binder material can bond together particles having up to 10 times, up to 20 times, or up to 25 times the weight of the fluid binder material. It is to be understood that the bonding processes described herein can also incorporate a pigment and/or another component of the particulate material or fluid binder material into the rigid, bonded structure that becomes a cross-sectional portion of the final article 40.

In some cases, the amount of fluid binder material 26 deposited onto the particulate material 20 can range from about 1% to 35% of the volume of the selectively printed area at a predetermined layer thickness, such as a thickness between about 50 and 175 microns or between about 75 and 125 microns. In some embodiments, the amount of fluid binder material is less than about 25%, less than about 20%, less than about 15%, less than about 10%, or less than about 5% of the volume of the selectively printed area.

The portion 32 of the particulate material 20 that was not exposed to the fluid binder material 26 remains loose and free-flowing on the movable surface 22. The unbonded or loose portion 32 of the particulate material is typically left in place until formation of the intermediate article 38 is complete. Leaving the dry, loose particulate material in place ensures that the intermediate article 38 is fully supported during the printing process, permitting features such as overhangs, undercuts, and cavities to be defined and formed without the need to use supplemental support structures. After formation of the first cross-sectional portion of the intermediate article 38, the movable surface 22 is indexed downwardly, and the process is repeated.

Specifically, using a counter-rolling mechanism for instance, a second film or layer of the particulate material is applied over the first layer, covering both the rigid first cross-sectional portion and any proximate loose particulate material. A second application of fluid binder material follows in the manner described above, forming bonds between at least a portion of the previous cross-sectional formed portion and between particles of the second layer, thereby forming a second rigid cross-sectional portion added to the first rigid cross-sectional portion of the final article.

Figure 3:
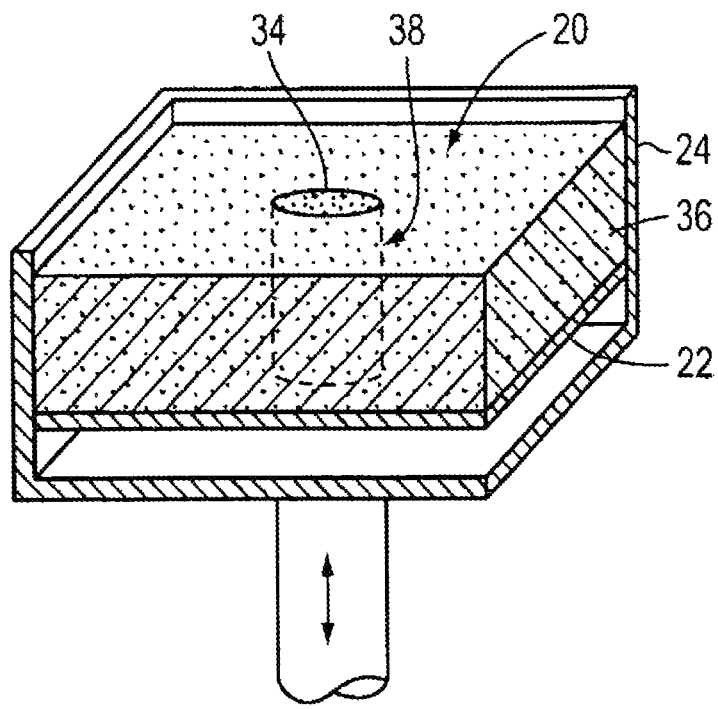
FIG. 3 is a schematic view of an article described herein enclosed in the container, the article made by a series of steps illustrated in FIG. 2 and embedded in loose unbound particles.

The movable surface 22 is again indexed downward, and the previous steps of applying a layer of particulate material and applying the fluid binder material, followed by indexing downward, are repeated until the intermediate article 38 is completed. Referring to FIG. 3, the intermediate article 38 may be any shape, such as cylindrical. At the end of the process, only a top surface 34 of the intermediate article 38 is visible in the container 24. The intermediate article 38 is typically completely immersed in a surrounding bed 36 of dry, loose, and unbonded particulate material. Alternatively, an article could be formed in layers upward from an immovable platform, by successively depositing, smoothing, and printing a series of such layers.

Figure 4:
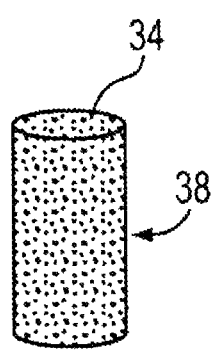
FIG. 4 is a schematic view of the article of FIG. 3.

Referring to FIG. 4, the loose particulate material may be removed from the intermediate article 38 by pressurized air flow or using a vacuum. After removal of the loose particulate material from the intermediate article 38, a post-processing treatment may be performed if desired, such as heating in an oven, painting, etc. to define a final article 40, having the same shape as intermediate article 38, but with additional desired characteristics, such as a smooth surface appearance, neutral chroma, high lightness, toughness, strength, and flexibility. A post-processing treatment may also comprise infiltrating the article with an infiltrant.

In some cases, the complete solidification, polymerization, or "cure" of the final article 40 may take between about 30 minutes and about 6 hours to complete after all the layers of the article have been printed. In other instances, such as when a UV curing process is used, the curing happens substantially instantaneously during printing, so that the printed article may be removed from the printer as soon as the printing is complete. In some embodiments described herein, a user typically waits the above-indicated time after the article is printed before removing the article from the printer. Further, in some instances, the article may be heated to a range of about 40° C. to about 100° C. to accelerate an aerobic cure at the surface of the article. Heat may be supplied through convection, conduction, infrared radiation, microwave radiation, radio-wave radiation, or any other suitable method.

II. Material Systems and Kits

In one aspect, material systems and kits are described herein. In some embodiments, a material system or kit comprises a substantially dry particulate material comprising an insoluble filler and/or soluble filler having a first functional group on the surface of the insoluble filler; and a fluid binder material comprising a multifunctional linker having a second functional group, wherein the insoluble filler is insoluble in the fluid binder material, the soluble filler is soluble in the fluid binder material, and wherein the first functional group and the second functional group can react with one another to form a covalent bond between the multifunctional linker and the insoluble filler and/or the soluble filler. A "substantially dry" particulate material, for reference purposes herein, includes less than about 5% by weight, less than about 2% by weight, less than about 1% by weight, or less than about 0.5% by weight water. A "multifunctional linker," for reference purposes herein, comprises a chemical species that has more than one functional group that can be used to form a covalent bond with another species. The other species could be another multifunctional linker, an insoluble filler particle, a soluble filler, or another species present in the fluid binder material or particulate material. Further, it is to be understood that a multifunctional linker described herein can react with two such species, such as two separate insoluble filler particles or one insoluble filler particle and one other multifunctional linker.

Moreover, the first and second functional groups of a material system or kit described herein can comprise any suitable pair of functional groups that can react with one another to form a covalent bond. For example, in some embodiments, the first and second functional groups each comprise an ethyleneically unsaturated moiety, such as a vinyl moiety or a (meth)acrylate moiety. A "(meth)acrylate" moiety, for reference purposes herein, can refer to either an acrylate moiety or a methacrylate moiety. In other embodiments, the first or second functional group comprises a hydroxyl, amine, amide, carboxyl, thiol, glycidyl, or epoxide group. An amine group can be a primary, secondary, or tertiary amine. Further, in some embodiments, the first or second functional group comprises a carbon radical species, a singlet oxygen species, or a peroxide. Moreover, in some cases, the first functional group comprises a vinyl, (meth)acrylate, hydroxyl, amine, or amide group, and the second functional group comprises a glycidyl, epoxide, vinyl, or (meth)acrylate group. Other pairs of functional groups may also be used.

Turning now to specific components of material systems or kits, material systems or kits described herein comprise a particulate material comprising an insoluble filler. Any insoluble filler not inconsistent with the objectives of the present invention may be used. In some embodiments, for example, the insoluble filler comprises or is formed from one or more of solid glass spheres, hollow glass spheres, solid ceramic spheres, hollow ceramic spheres, solid rubber spheres, hollow rubber spheres, solid metal spheres, hollow metal spheres, potato starch, tabular alumina, calcium sulfate hemihydrate, calcium sulfate dehydrate, calcium carbonate, ultra-high molecular weight polyethylene, polyamide, poly-cyclic-olefins, polyurethane, and polypropylene. Further, in some cases, the insoluble filler comprises core-shell particles formed from a core component comprising or formed from one or more of the foregoing materials and a shell component comprising or formed from a polymer such as polymethyl(meth)acrylate, polyethyl (meth)acrylate, polybutyl(meth)acrylate, or a combination thereof. The polymer of such a shell, in some embodiments, comprises one or more ethyleneically unsaturated moieties, including one or more ethyleneically unsaturated moieties on the surface of the particle. Moreover, in some cases, the polymer of such a shell has a weight average molecular weight between about 50,000 and about 1,000,000 or between about 100,000 and about 500,000. The structure of such core-shell particles, in some embodiments, can be demonstrated by spectroscopic methods such as infrared (IR) spectroscopy and/or by optical methods such as optical microscopy. Additionally, in some instances, an insoluble filler described herein comprises surface-functionalized particles formed from one or more of the foregoing materials (such as polymethyl(meth)acrylate, polyethyl(meth)acrylate, poly(butyl)methacrylate, or a combination thereof), wherein the particles further comprise a plurality of ethyleneically unsaturated groups on the surface, such as one or more acrylate groups or vinyl groups, which may be derived from pendant groups of the polymers. Moreover, in some embodiments, the insoluble filler comprises or is formed from an insoluble version of a material described hereinbelow as a possible soluble filler material.

In some cases, the insoluble filler comprises glass microspheres. The glass microspheres may be made from borosilicate glass with an index of refraction of 1.5 and may be spherical with a particle size distribution ranging from greater than about 20 microns to less than about 125 microns, or between about 40 and 90 microns. Further, the glass microspheres may be treated with an aminosilane, hydroxysilane, ethyleneically unsaturated silane, or another silane to provide a desired first functional group on the surface of the microspheres, such as an amine, hydroxyl, or vinyl functional group.

In some embodiments, an insoluble filler described herein consists primarily of spherically shaped particles having a particle size distribution wherein 10% of the particles have a size less than about 30 or 40 microns, 90% of the particles have a size less than about 90 or 125 microns, and 50% of the particles have a size between about 50 and 70 microns.

An insoluble filler described herein can be present in the particulate material in any amount not inconsistent with the objectives of the present invention. In some embodiments, for instance, the particulate material of a material system or kit described herein comprises about 5 to about 50% by weight insoluble filler, based on the total weight of the particulate material. In some embodiments, the particulate material comprises about 5 to about 40% by weight insoluble filler or about 10 to about 30% by weight insoluble filler. In other cases, the particulate material comprises about 50 to about 90% by weight insoluble filler, about 60 to about 80% by weight insoluble filler, or about 70 to about 90% by weight insoluble filler, based on the total weight of the particulate material.

A particulate material described herein, in some embodiments, further comprises a soluble filler, the soluble filler being soluble in the fluid binder material. Any soluble filler not inconsistent with the objectives of the present invention may be used. In some cases, for instance, the soluble filler comprises or is formed from a methyl methacrylate polymer, ethyl methacrylate polymer, butyl methacrylate polymer, polyvinylbutyral, or a combination thereof. In some embodiments, a soluble filler is formed from a solid methacrylate polymer with a glass transition temperature between about 40 and about 70° C. and a weight-average molecular weight between about 100,000 and about 500,000 g/mol. Another example of a suitable soluble filler is a polymethylmethacrylate/ethyl methacrylate co-polymer resin such as ELVACITE 2014, available from Lucite International based in Cordova, Tenn. Another suitable resin is a butylmethacrylate/methylmethacrylate copolymer resin such as NEOCRYL B-723, available from NeoResins based in Wilmington, Mass.

Moreover, in some cases, a soluble filler described herein can comprise a functional group that can react with a functional group of a fluid binder material to form one or more covalent bonds. Any functional group not inconsistent with the objectives of the present invention may be used. In some embodiments, for instance, the functional group of the soluble filler comprises a first functional group described hereinabove. Other functional groups may also be used.

In some embodiments, a soluble filler described herein may be processed to achieve a particle size distribution wherein 10% of the particles have a size less than 20 to 30 microns, 90% of the particles have a size less than 80 to 100 microns, and 50% of the particles have a size between 50 and 70 microns.

A soluble filler described herein can be present in the particulate material in any amount not inconsistent with the objectives of the present invention. In some embodiments, for instance, the particulate material of a material system or kit described herein comprises about 10 to about 50% by weight soluble filler, based on the total weight of the particulate material. In some embodiments, the particulate material comprises about 10 to about 40% by weight soluble filler or about 20 to about 50% by weight soluble filler. In other cases, the particulate material comprises about 50 to about 95% by weight soluble filler, about 60 to about 90% by weight soluble filler, or about 70 to about 85% by weight soluble filler, based on the total weight of the particulate material.

A particulate material described herein, in some embodiments, further comprises one or more pigments. Any pigment not inconsistent with the objectives of the present invention may be used. For example, in some embodiments, a pigment comprises an inorganic material such as titanium dioxide, zinc oxide, zinc sulfide, barium sulfate, zirconium silicate, lead carbonate, or hollow borosilicate glass spheres. In other cases, a pigment comprises an organic material such as an organic dye or a pigmented polymeric bead such as DECOSOFT and DECOSILK pigmented polyurethane and acrylic microbeads, respectively, available from Microchem based in Erlenback, Switzerland.

Pigments described herein may also be incorporated and bound into the insoluble filler or soluble filler, which may be advantageous to prevent the particulate material from exhibiting excessive dust or agglomeration, since unbound pigments may in some cases adhere to processing aids used to control the desired spreading and flowability characteristics of the material system. For example, a colorant used for injection molding applications may be used to provide color to a soluble filler, such as ELVACITE 2014, through melt processing.

A pigment described herein can be present in the particulate material in any amount not inconsistent with the objectives of the present invention. In some embodiments, for instance, the particulate material of a material system or kit described herein comprises about 0.5 to about 5% by weight pigment, based on the total weight of the particulate material.

A particulate material described herein, in some embodiments, further comprises a catalyst. Any catalyst not inconsistent with the objectives of the present invention may be used. In some cases, the catalyst comprises a transition metal catalyst. A transition metal catalyst may be used to induce or facilitate the decomposition of another species present in the material system. For example, if an organic hydroperoxide is present in the fluid binder material of the material system, the transition metal catalyst may induce the decomposition of the organic hydroperoxide in the fluid binder material to generate free radicals and to catalyze the absorption of oxygen for allylic polymerization. Alternatively, if a photoinitiator is present instead of the organic hydroperoxide, the transition metal catalyst may work cooperatively with the photoinitiator, including in the presence of initiating or activating radiation, to generate free radicals and to catalyze the absorption of oxygen for allylic polymerization. "Transition metals," for reference purposes herein, comprise d-block metals of the Periodic Table of the Elements. In some cases, a transition metal catalyst comprises a transition metal cation that has multiple oxidation states and can readily lose or gain an electron in the presence of an oxidizing or reducing agent, respectively. In some embodiments, a transition metal catalyst comprises copper, iron, vanadium, manganese, titanium, or cobalt. Other transition metal catalysts may also be used. Non-limiting examples of transition metal catalysts suitable for use in some embodiments described herein include cobalt (II) octoate, cobalt (II) naphthenate, vanadium (II) octoate, manganese naphthenate, and combinations thereof.

A catalyst described herein can be present in the particulate material in any amount not inconsistent with the objectives of the present invention. In some embodiments, for instance, the particulate material of a material system or kit described herein comprises about 0.01 to about 1% by weight catalyst, based on the total weight of the particulate material.

A particulate material described herein, in some embodiments, further comprises one or more processing aids. In some cases, processing aids may be used to affect particulate material spreading characteristics to achieve a desired internal angle of friction (as described further hereinbelow) and/or to reduce capillary forces between particulate material in contact with a fluid binder material. Processing aids may also reduce nuisance dust of the particulate material. Any processing aids not inconsistent with the objectives of the present invention may be used. In some cases, a processing aid comprises one or more of a mineral oil, a hydrogenated hydrocarbon resin such as REGALREZ 1094 from Eastman based in Kingsport, Tenn., a surfactant, propylene glycol di(caprylate/caprate), petroleum jelly, propylene glycol, diisobutyl phthalate, diisononyl phthalate, polyalkyleneoxide modified heptamethyltrisiloxanes, polyalkyleneoxide modified polydimethylsiloxanes, secondary alcohol ethoxylates, hydrogenated hydrocarbon resins, polydimethyl silicone, and poly alphaolefins.

In some embodiments, a surfactant is used in conjunction with mineral oil to reduce the capillary forces between particulate material in contact with fluid binder material by increasing the critical surface tension of the particulate material. Any surfactant not inconsistent with the objectives of the present invention may be used. In some cases, a surfactant comprises a silicone surfactant such as SILWET L-7608 or COATOSIL L-77 from General Electric Company based in Wilton, Conn. In other cases, a surfactant comprises a secondary ethoxylated alcohol hydrocarbon surfactant such as TERGITOL 15-S-7 or TERGITOL-15-S-5 from DOW based in Midland, Mich.

A processing aid described herein can be present in the particulate material in any amount not inconsistent with the objectives of the present invention. In some embodiments, for instance, the particulate material of a material system or kit described herein comprises about 0.01 to about 5% by weight processing aid or about 0.01 to about 2% by weight processing aid, based on the total weight of the particulate material.

A particulate material described herein can be suitable for use in three dimensional printing to form an article comprised of a plurality of layers, the layers including a reaction product of the particulate material and the fluid binder material that contacts the particulate material during three dimensional printing. A method that may be used in some instances to quantify a particulate material's suitability for three dimensional printing includes placing one liter of bulk volume of a particulate material in a metal cylinder with an inside dimension of 6.1 inches and an inside height of 6.2 inches so that the height of the particulate material is between 2.5 and 3.0 inches when the cylinder is capped with a translucent cover and laid on its side (i.e., the height of the cylinder is horizontal). The cylinder is then slowly rolled with a rotational velocity of 2.5 rotations/min+/–0.5 rotations/min until the particulate material reaches an angle at which it avalanches upon itself. The distance that the cylinder rolled, s, is recorded and an angle, Φ, can be determined from Equation (1):

$$\varphi = \frac{s}{r} \times \frac{180}{\pi}, \tag{1}$$

where r is the outside radius of the cylinder. The angle, Φ, is the internal angle of friction of the particulate material. The test is carried out at a room temperature between 65 and 75° F. In some embodiments, a particulate material described herein suitable for use in three dimensional printing has an internal angle of friction greater than 40° and less than 70°. In addition, in some cases, a particulate material described herein suitable for use in three dimensional printing has an average particle size between about 30 microns and about 125 microns.

Further, in some embodiments, a particulate material described herein suitable for use in three dimensional printing has a critical surface tension of greater than about 20 dynes/cm. The critical surface tension of a particulate material is described further below.

Capillary pressure of a fluid may be described by Equation (2):

$$\Delta p = 2\gamma_{lv} \cos \theta / r \tag{2}$$

where Δp is the capillary pressure, which is the pressure difference across the fluid interface, $\gamma_{lv}$ is the surface tension at the liquid-vapor interface of the fluid, r is the average radius of the capillaries, and θ is the contact angle at the fluid-solid interface.

The contact angle, θ, is the angle of contact between a liquid and solid. A contact angle of 0° suggests that the fluid will spontaneously wet the entire surface of the solid to which it is applied, while a contact angle greater than 90° suggests that the fluid will not spontaneously spread and wet the surface of the solid to which it is applied. "Spontaneously," for reference purposes herein, refers to a process associated with a negative change in Gibbs free energy and does not denote an instance of time. The contact angle may be defined by the Young and Dupre equation, Equation (3):

$$\cos \theta = \frac{\gamma_{sv} - \gamma_{sl}}{\gamma_{lv}}, \tag{3}$$

where $\gamma_{sv}$ is the surface energy at the solid and vapor interface, and $\gamma_{sl}$ is the surface energy at the solid and liquid interface. The difference of $\gamma_{sv}-\gamma_{sl}$ in the numerator of Equation (3) may be defined as the adhesion tension of the solid at the solid-liquid-vapor interfaces. It may be desirable to have this adhesion tension greater than or equal to the surface tension of the fluid at the liquid-vapor interface. The adhesion tension may be related to the surface characteristic defined as the critical surface tension by Zisman as described further hereinbelow.

One can see from Equation (2) that capillary pressure increases if the average radius of the capillaries decreases and/or if the contact angle increases through an increase of the fluid's surface tension, and/or the adhesion tension of the solid decreases. This effect of capillary pressure infiltrating a porous medium may be measured by the Washburn infiltration method. The Washburn equation describes the time a fluid takes to infiltrate into and through a porous medium. The Washburn equation can be expressed in the form of Equation (4):

$$\cos \theta = \frac{m^2}{t} \frac{\eta}{\rho^2 \sigma c}, \tag{4}$$

where θ is the contact angle at the liquid-solid interface, m is the mass of fluid, t is time, η is the viscosity of the fluid, ρ is the density of the fluid, and c is a material constant.

Figure 5:
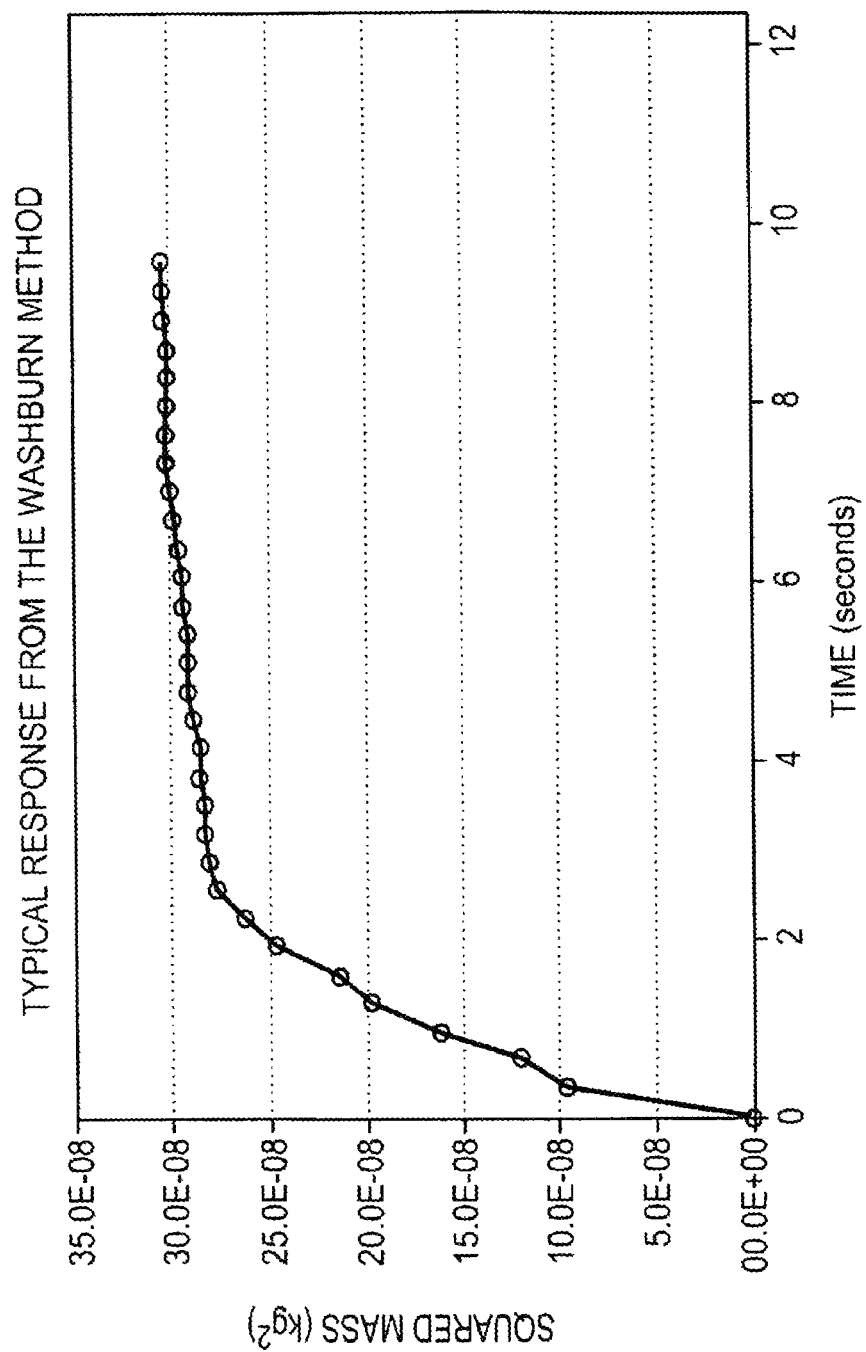
FIG. 5 is a graph illustrating a typical response from the Washburn infiltration method to determine the material constant and contact angle of a fluid binder material against a particulate material.

The material constant c may be determined by infiltrating a porous medium with a very low surface tension fluid that will have a contact angle of 0° against the solid surface of particles comprising the porous medium. n-Hexane is a common fluid used for such purposes, having a surface tension of 18 dynes/cm; it is assumed to have a contact angle of 0° against most solid surfaces. This makes the value of cos θ equal to 1 in Equation (4), thereby making it possible to solve for the material constant c, since the fluid properties of n-hexane are known. This leaves one to measure the rate of mass increase of the fluid infiltrating the porous medium over time. This mass-time response may be measured by use of a Kruss Processor Tensiometer K100 with accessories for Washburn contact angle measurement, available from KRUSS USA based in Matthews, N.C., or by use of a KSV Sigma 70 Tensiometer from KSV Instruments USA based in Monroe, Conn., or by use of a similar instrument. With these instruments, a vial of powder is prepared. The vial is perforated at a bottom portion, with a piece of porous filter paper preventing the powder from pouring through the perforated bottom. The vial filled with powder is attached to a microbalance, and the bottom of the vial is brought into contact with the surface of the fluid, in this case n-hexane. Software records the mass increase of the vial over time from the microbalance as the fluid is drawn into the powder in the vial largely by capillary pressure. One may then plot the mass squared over time, which should result in a straight line during the time fluid is infiltrating into the powder in the vial. FIG. 5 illustrates a typical response from the Washburn infiltration method to determine the material constant and contact angle of a fluid against a particulate material. The slope may be calculated from the plot, which corresponds to the value of $m^2/t$ in Equation (4). After the slope is calculated, one may solve for the material constant c.

The material constant c is sensitive to the packing density of the powder in the vial in which it is prepared, so it is preferable to use a method that consistently provides the same packing density in the vial for each test. It is theorized that the material constant has the relationship of Equation (5):

$$C = \frac{1}{2}\pi^2 r^5 n^2 \qquad (5),$$

where r is the average capillary radius of the porous medium, and n is the number of capillary channels. Loosely packed powder will have a larger average capillary radius, increasing the material constant. Conversely, densely packed powder will have smaller average capillary radius, decreasing the material constant.

The Washburn method may also be utilized to determine the contact angle the fluid binder material of a material system or kit described herein forms with the particulate material, since the material constant can be determined for each particulate formulation. In some embodiments, a contact angle of the fluid binder material is less than about 25° when in contact with a particulate material described herein suitable for use in three dimensional printing.

Additional information regarding contact angle, capillary pressure, and adhesion tension may be found in the Physical Chemistry of Surfaces, Adamson, Arthur W., Interscience Publishers, Inc., 1967, and regarding the Washburn method in "Wettability Studies for Porous Solids Including Powders and Fibrous Materials—Technical Note #302" by Rulison, Christopher, 1996, which is a manufacturer's application note from KRUSS USA, the disclosures of which are incorporated herein by reference in their entireties.

A material system or kit described herein also comprises a fluid binder material. In some embodiments, the fluid binder material comprises a multifunctional linker. Any multifunctional linker not inconsistent with the objectives of the present invention may be used. In some embodiments, for instance, a multifunctional linker comprises a chemical species comprising two or more functional groups that can form a covalent bond with another species present in the material system or kit. For example, in some cases, a multifunctional linker comprises a difunctional linker comprising two functional groups that can each form a covalent bond with another species present in the material system or kit, such as two separate particles of insoluble filler material. The functional groups can comprise any of the functional groups described hereinabove for the first and second functional groups of the system or kit. For example, in some cases, a multifunctional linker described herein is a chemical species having two ethyleneically unsaturated moieties, such as a divinyl chemical species or a di(meth)acrylate chemical species. In other instances, a multifunctional linker described herein comprises a dihydroxyl chemical species, a diamine chemical species, a diamide chemical species, a dicarboxyl chemical species, a dithiol chemical species, a diglycidyl chemical species, or a diepoxide chemical species. Moreover, it is also possible for a multifunctional linker of a fluid binder material described herein to comprise a mixture of the functional groups described above. For example, a multifunctional linker, in some cases, can have one glycidyl moiety and one (meth)acrylate moiety. Thus, in some embodiments, a multifunctional linker comprising a second functional group described hereinabove can also comprise a third functional group that differs from the second functional group, the third functional group being self-curing.

A multifunctional linker can be present in the fluid binder material in any amount not inconsistent with the objectives of the present invention. In some embodiments, for instance, the fluid binder material of a material system or kit described herein comprises about 1 to about 95% by weight multifunctional linker, based on the total weight of the fluid binder material. In some embodiments, the fluid binder material comprises about 1 to about 40% by weight, about 5 to about 30% by weight, about 10 to about 50% by weight, about 10 to about 20% by weight, about 15 to about 60% by weight, about 20 to about 70% by weight, about 20 to about 60% by weight, about 30 to about 80% by weight, about 30 to about 60% by weight, about 35 to about 95% by weight, about 40 to about 90% by weight, about 40 to about 80% by weight, about 50 to about 95% by weight, about 50 to about 85% by weight, about 60 to about 90% by weight, or about 60 to about 75% by weight multifunctional linker, based on the total weight of the fluid binder material.

The fluid binder material of a material system or kit described herein, in some embodiments, further comprises an ethyleneically unsaturated monomer or oligomer. Any ethyleneically unsaturated monomer or oligomer not inconsistent with the objectives of the present invention may be used. In some embodiments, for example, the ethyleneically unsaturated monomer or oligomer comprises a (meth)acrylate monomer or oligomer. Any (meth)acrylate monomer or oligomer not inconsistent with the objectives of the present invention may be used. Some suitable (meth)acrylate monomers or oligomers may be procured, for instance, from Sartomer based in Exton, Pa.

In other cases, the ethyleneically unsaturated monomer or oligomer comprises an allyl ether monomer or oligomer. Any allyl ether monomer or oligomer not inconsistent with the objectives of the present invention may be used. Some suitable allyl ether monomers or oligomers may be procured, for instance, from Perstorp based in Sweden. Suitable oligomers with allyl functionality may be obtained from Sartomer, such as CN-9101, a urethane allyl functional oligomer, or from Bomar Specialty Chemicals based in CT, such as BXI-100, a poly-allyl-glycidyl-ether oligomer.

An ethyleneically unsaturated monomer or oligomer can be present in the fluid binder material in any amount not inconsistent with the objectives of the present invention. In some embodiments, for instance, the fluid binder material of a material system or kit described herein comprises about 1 to about 80% by weight ethyleneically unsaturated monomer or oligomer, based on the total weight of the fluid binder material. In some embodiments, the fluid binder material comprises about 1 to about 40% by weight, about 5 to about 30% by weight, about 10 to about 50% by weight, about 10 to about 20% by weight, about 15 to about 60% by weight, about 20 to about 70% by weight, about 20 to about 60% by weight, about 30 to about 80% by weight, about 30 to about 60% by weight, about 40 to about 80% by weight, about 40 to about 60% by weight, about 50 to about 80% by weight, or about 50 to about 70% by weight ethyleneically unsaturated monomer or oligomer, based on the total weight of the fluid binder material.

A fluid binder material described herein, in some embodiments, further comprises an organic hydroperoxide and/or a photoinitiator. When present, an organic hydroperoxide can be a free radical initiator for the anaerobic polymerization of (meth)acrylate monomers or oligomers, and/or the aerobic polymerization of allylic monomers or oligomers. Any organic hydroperoxide not inconsistent with the objectives of the present invention can be used. One suitable organic hydroperoxide is cumene hydroperoxide available as LUPEROX CU90 from Arkema based in Philadelphia, Pa. Another organic hydroperoxide suitable for use with some embodiments described herein is tert-butyl hydroperoxide, available as T-HYDRO from Lyondell Chemical Company based in Houston, Tex.

Similarly, when present, a photoinitiator can be a free radical initiator for the polymerization of (meth)acrylate monomers or oligomers and/or allylic monomers or oligomers. Any photoinitiator not inconsistent with the objectives of the present invention can be used. In some embodiments, a suitable photoinitiator comprises an alpha-cleavage type (unimolecular decomposition process) photoinitiator or a hydrogen abstraction photosensitizer-tertiary amine synergist, operable to absorb light preferably between about 250 nm and about 400 nm or between about 300 nm and about 365 nm, to yield free radicals.

Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In some embodiments, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

In some embodiments, suitable photoinitiators comprise those operable for use with a HeCd laser radiation source, including acetophenones, conveniently 2,2-dialkoxybenzophenones and 1-hydroxyphenyl ketones, for example 1-hydroxycyclohexyl phenyl ketone or 2-hydroxyisopropyl phenyl ketone (=2-hydroxy-2,2-dimethylacetophenone). Additionally, in some embodiments, suitable photoinitiators comprise those operable for use with an Ar laser radiation source including benzil ketals, such as benzil dimethyl ketal. In some embodiments, a photoinitiator comprises an $\alpha$-hydroxyphenyl ketone, benzil dimethyl ketal or 2,4,6-trimethylbenzoyldiphenylphosphine oxide or a mixture thereof.

Another class of suitable photoinitiators comprises ionic dye-counter ion compounds capable of absorbing actinic radiation and generating free radicals for polymerization initiation. In some embodiments, compositions containing ionic dye-counter ion compounds can be cured more variably with visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530 and 4,772,541.

An organic hydroperoxide or a photoinitiator can be present in a fluid binder material in any amount not inconsistent with the objectives of the present invention. In some embodiments, a photoinitiator or organic hydroperoxide is present in a fluid binder material in an amount of up to about 1 weight percent. In some embodiments, a photoinitiator or organic hydroperoxide is present in an amount ranging from about 0.01 weight percent to about 1 weight percent or from about 0.1 weight percent to about 0.2 weight percent, based on the total weight of the fluid binder material.

Moreover, in some embodiments, the amount and/or identity of a photoinitiator or organic hydroperoxide described herein and/or the amount and type of electromagnetic radiation used with a photoinitiator are selected to control (e.g., to limit or minimize) the amount of polymerization directly initiated by the irradiation of the photoinitiator, compared to the amount of polymerization initiated by other means, such as the cooperation of the photoinitiator with a transition metal catalyst of the particulate material, if such a catalyst is present. For example, in some embodiments, a relatively short period of UV irradiation may be used (such as 3 seconds or less). In other embodiments, a light emitting device (LED) having a lower power than some UV radiation sources can be used as the source of activating or initiating radiation.

A fluid binder material described herein, in some embodiments, further comprises a surfactant. Any surfactant not inconsistent with the objectives of the present invention may be used. In some cases, a surfactant is used to reduce the surface tension of the fluid binder material such that the surface tension of the fluid binder material is equal to or less than the critical surface tension of the particulate material. In this manner, the contact angle of the fluid binder material against the particulate material can be selected to be less than 25° or between about 0° and about 5°. Non-limiting examples of surfactants suitable for use in some embodiments described herein include a polyether modified acryl functional polydimethylsiloxane surfactant available as BYK UV 3500 from BYK Chemie based in Hartford, Conn., and a fluorinated surfactant such as the ZONYL surfactants available from DuPont.

A surfactant can be present in a fluid binder material in any amount not inconsistent with the objectives of the present invention. In some embodiments, a surfactant is present in a fluid binder material in an amount of up to about 5% by weight, based on the total weight of the fluid binder material. In some cases, a surfactant is present in a fluid binder material in an amount between about 0.1 and about 3% by weight, based on the total weight of the fluid binder material.

It is to be understood that material systems and kits described herein can comprise any combination of components not inconsistent with the objectives of the present invention. For example, any particulate material described herein can be used in combination with any fluid binder material described herein.

III. Methods of Printing a Three Dimensional Article

In another aspect, methods of printing a three dimensional article are described herein. In some embodiments, a method of printing a three dimensional article comprises providing a substantially dry particulate material including a plurality of adjacent particles, the particulate material comprising an insoluble filler; and applying a fluid binder material to at least some of the plurality of particles in an amount sufficient to bond the particles together to define a cross-sectional portion of the article, wherein the insoluble filler is insoluble in the fluid binder material and wherein the particles are bonded together with chemical bonds having a high bond strength. In some instances, the particulate material further comprises a soluble filler, the soluble filler being soluble in the fluid binder material. In some cases, a method described herein further comprises forming reactive sites on the surface of the particles, and the reactive sites permit the formation of relatively strong chemical bonds between the particles. In other instances, the formation of such reactive sites is not necessary to provide chemical bonds having a high bond strength. For example, in some embodiments, the insoluble filler and/or the soluble filler of the particulate material comprises a first functional group, the fluid binder material comprises a multifunctional linker having a second functional group, and covalent bonds are formed by reacting the first functional group with the second functional group. In such instances, it is to be understood that the multifunctional linker can comprise two or more second functional groups, and each second functional group of the multifunctional linker can form a covalent bond with a first functional group. In some cases, the multifunctional linker can thereby link two or more particles of the particulate material to one another, including through covalent bonds. It is also possible to form strong bonds between particles in other manners, as described further hereinbelow.

Turning now to specific steps of methods, methods of printing a three dimensional article described herein comprise providing a substantially dry particulate material including a plurality of adjacent particles, the particulate material comprising an insoluble filler and/or a soluble filler. A particulate material can be provided in any manner not inconsistent with the objectives of the present invention. In some embodiments, for instance, a particulate material is provided in a manner described hereinabove in Section I. In addition, any particulate material not inconsistent with the objectives of the present invention may be used. In some embodiments, the particulate material is a particulate material described hereinabove in Section II.

Methods described herein also comprise applying a fluid binder material to at least some particles to bond the particles together with chemical bonds having a high bond strength. In some cases, the particles are bonded together with chemical bonds having a bond strength of at least about 10 kJ/mol. In other embodiments, the particles are bonded together with chemical bonds having a bond strength of at least about 50 kJ/mol, at least about 100 kJ/mol, at least about 200 kJ/mol, at least about 250 kJ/mol, or at least about 300 kJ/mol. In some cases, the particles are bonded to one another with chemical bonds having a bond strength between about 10 kJ/mol and about 450 kJ/mol, between about 50 kJ/mol and about 400 kJ/mol, between about 100 kJ/mol and about 400 kJ/mol, between about 200 kJ/mol and about 450 kJ/mol, between about 250 kJ/mol and about 450 kJ/mol, or between about 300 kJ/mol and about 400 kJ/mol.

The chemical bonds between particles can comprise any chemical bonds not inconsistent with the objectives of the present invention. In some embodiments, for instance, the chemical bonds comprise covalent chemical bonds, such as covalent bonds formed by the reaction of a first functional group described herein with a second functional group described herein. For example, in some cases, the chemical bonds comprise one or more carbon-carbon single bonds, one or more ester bonds, one or more amide bonds, or one or more urethane bonds. In other embodiments, the chemical bonds comprise non-covalent bonds. In some cases, for instance, the chemical bonds comprise one or more hydrogen bonds. Moreover, it is again to be understood that such chemical bonds can link together two or more particles of particulate material. Additionally, in some instances, a single multifunctional linker can link together two particles through the formation of two chemical bonds described hereinabove. Further, the identity and/or presence of such bonds, in some cases, can be provided by spectroscopic methods such as IR spectroscopy.

In addition, a fluid binder material can be applied to particles of a particulate material in any manner not inconsistent with the objectives of the present invention. In some embodiments, for instance, a fluid binder material is applied in a manner described hereinabove in Section I. Moreover, any fluid binder material not inconsistent with the objectives of the present invention may be used. In some cases, the fluid binder material comprises a fluid binder material described hereinabove in Section II.

Further, any amount of fluid binder material not inconsistent with the objectives of the present invention may be used. In some embodiments, less than about 25% by weight fluid binder material is used, based on the total weight of the fluid binder material and the particulate material. In other cases, less than about 20% by weight, less than about 15% by weight, less than about 10% by weight, or less than about 5% by weight fluid binder material is used, based on the total weight of the fluid binder material and the particulate material. In some instances, about 1 to 20% by weight, about 1 to 15% by weight, about 1 to 10% by weight, about 1 to 5% by weight, or about 1 to 3% by weight fluid binder material is used, based on the total weight of the fluid binder material and the particulate material. Moreover, in some embodiments, the amount of fluid binder material is selected based on whether or not the formation of a continuous binder material phase in the printed article is desired. For example, in some embodiments wherein a continuous binder material phase is desired, a relatively large amount of fluid binder material is used. Alternatively, in other embodiments wherein a non-continuous binder material phase is desired, a relatively small amount of fluid binder material is used. Thus, methods described herein, in some cases, can provide printed articles having easily tunable ratios of particulate material and binder material, without the need to alter the chemical composition of the particulate material or fluid binder material during printing.

Methods described herein, in some embodiments, further comprise forming reactive sites on the surface of the particles of the particulate material. Reactive sites can be formed on the particle surfaces in any manner not inconsistent with the objectives of the present invention. In some embodiments, for instance, the reactive sites are formed by treating the particles with a high energy activation source, such as treatment with one or more of an electron beam, a plasma, and ozone. Reactive sites can also be formed by electromagnetic radiation irradiation or bombardment by a particle beam other than an electron beam. Such a treatment can provide any amount of energy to the particle surfaces not inconsistent with the objectives of the present invention. In some embodiments, for instance, a treatment described herein provides an energy to a surface of at least about 50 $mJ/cm^2$, at least about 100 $mJ/cm^2$, at least about 200 $mJ/cm^2$, at least about 300 $mJ/cm^2$, or at least about 500 $mJ/cm^2$. In some cases, a treatment described herein provides an energy to a surface between about 50 $mJ/cm^2$ and about 600 $mJ/cm^2$, between about 50 $mJ/cm^2$ and about 500 $mJ/cm^2$, between about 100 $mJ/cm^2$ and about 400 $mJ/cm^2$, or between about 150 $mJ/cm^2$ and about 450 $mJ/cm^2$.

In addition, forming reactive sites on the surface of particles in a manner described herein, in some embodiments, comprises forming one or more of carbon radicals, singlet oxygen species, and peroxides. In some cases, reactive sites comprise ionized metal species and/or silane or siloxane radical species. Other reactive sites can also be formed.

Moreover, in some embodiments wherein reactive sites are formed on the surface of particles, a method described herein can further comprise reacting the reactive sites on the surface of the particles with one or more chemical species comprising a first functional group to provide functionalized particles comprising the first functional group. The first functional group can comprise any first functional group described herein, including a first functional group described hereinabove in Section II. Such a further functionalization step can be carried out in any manner not inconsistent with the objectives of the present invention. For example, in some cases, the reactive sites of the particles are exposed to a chemical species comprising the desired first functional group (such as an amine group, for instance) as well as an additional functional group that is reactive with the particular reactive site of the particles (such as an ethyleneically unsaturated moiety for reaction with a carbon radical reactive site on the particles). In addition, in some embodiments wherein such a further functionalization step is carried out, the first functional group of the functionalized particles can, if desired, be further reacted with a component of a liquid binder material in a manner described hereinabove in Section II. For instance, in some cases, a fluid binder material comprises a multifunctional linker having a second functional group and the particles are bonded together by reacting the first functional group of the particles with the second functional group of the multifunctional linker.

Alternatively, in other embodiments, such additional functionalization of particles is not necessary. Instead, reactive sites formed on the surface of particles in a manner described herein can themselves be used to form strong bonds directly with a component of the fluid binder material. For example, in some cases, a reactive site comprising a carbon radical can react directly with a multifunctional linker comprising an ethyleneically unsaturated moiety to form a covalent carbon-carbon bond between the particle and the linker. Moreover, in some embodiments, the reactive site can initiate a polymerization or oligomerization reaction that can be used to bond a plurality of particles to one another and/or to a matrix of the binder material. Further, in some cases, a reactive site can promote or facilitate the formation of relatively strong non-covalent bonds between particles, such as relatively strong hydrogen bonds.

Additionally, reactive sites can be formed on the surface of particles in a manner described herein at any of a number of time points during a printing process described herein. For example, in some cases, the reactive sites are formed prior to applying the fluid binder material to the particles. For instance, in some embodiments, reactive sites can be formed by exposing the particulate material to a high energy activation source described herein in a separate activation container or chamber prior to carrying out a printing process described in Section I hereinabove. Alternatively, in other instances, the reactive sites are formed substantially simultaneously with applying the fluid binder material to the particles. For example, in some embodiments, a high energy activation source can be used in conjunction with the fluid binder material print head during printing, including in a pixel-by-pixel or voxel-by-voxel manner, wherein only a selected portion of a bed of particulate material is activated for chemical bonding with the fluid binder material. It is also possible to simultaneously activate the entire bed of particulate material in a manner described herein, including in a manner substantially simultaneous with the application of the fluid binder material.

In addition to the methods described hereinabove, strong bonds between the particles of a particulate material described herein can also be provided in other ways. For example, a method of printing a three dimensional article can be carried out using a particulate material and a fluid binder material comprising a pair of functional groups that are reactive with one another only above a desired energy threshold, such as only above a specific temperature or only in the presence of activating electromagnetic radiation. Other methods can also be used. Thus, various methods described herein permit the selective formation of strong chemical bonds between particles of a particulate material and/or components of a fluid binder material. Moreover, as described herein, the ability of the printing process to form such bonds can be "turned on" or "turned off" selectively without changing the composition of the particulate material or the fluid binder material. For example, in some embodiments, the ability to form strong chemical bonds can be "turned on" by providing a threshold reaction energy described herein or "turned off" by not providing the threshold reaction energy. Similarly, as described further herein, a binder material phase of a three dimensional article can be selectively continuous or non-continuous, as desired by a user. Further, in some embodiments, the foregoing alterations of the microstructure of a printed article can be made on a pixel-by-pixel, voxel-by-voxel, or cross-sectional portion-by-cross-sectional portion basis, thereby providing substantial tunability of the mechanical properties of the printed article.

IV. Printed Three Dimensional Articles

In another aspect, printed three dimensional articles are described herein. In some embodiments, a printed three dimensional article described herein comprises a particulate material phase including a plurality of particles; and a binder material phase in contact with the particulate material phase, wherein the particles of the particulate material phase are bonded together with chemical bonds having a relatively high bond strength. The chemical bonds can have any bond strength described hereinabove in Section III. For example, in some cases, the chemical bonds have a bond strength of at least about 50 kJ/mol, at least about 100 kJ/mol, or at least about 200 kJ/mol. Further, the chemical bonds can be any type of chemical bond described hereinabove in Section III. In some embodiments, for instance, the particles are covalently bonded to one another.

In addition, in some cases, the particles are covalently bonded to one another through one or more covalent bonds between the particles and a multifunctional linker of the binder material phase. Further, the binder material phase can be a continuous phase or a non-continuous phase. A "continuous" binder material phase, for reference purposes herein, comprises a phase that is formed from the binder material and in which at least about 80%, at least about 90%, at least about 95%, or at least about 99% of the binder material forms a continuous solid network, such as through "necking" of neighboring conglomerations of binder material. In some embodiments, the use of more than about 10% by weight or more than about 15% by weight binder material, based on the total weight of the printed article, can result in a continuous binder material phase. A "non-continuous" binder material phase, for reference purposes herein, comprises a phase that is formed from the binder material but which is not a continuous binder material phase. In some embodiments, the use of less than about 15% by weight or less than about 10% by weight binder material, based on the total weight of the printed article, can result in a non-continuous binder material phase. Thus, in some embodiments, a printed article described herein comprises a relative amount of binder material described hereinabove in Section III. In some cases, for instance, the binder material phase is present in the article in an amount less than about 25% by weight, less than about 20% by weight, less than about 15% by weight, less than about 10% by weight, or less than about 5% by weight, based on the total weight of the particulate material phase plus the binder material phase. In some embodiments, the binder material phase is present in the article in an amount of about 1 to 25% by weight, about 1 to 20% by weight, about 1 to 15% by weight, about 1 to 10% by weight, about 1 to 5% by weight, or about 1 to 3% by weight, based on the total weight of the particulate material phase plus the binder material phase.

The particulate material phase of an article described herein can comprise, consist of, or be formed from any particulate material described hereinabove in Section II. Similarly, the binder material phase of an article described herein can comprise, consist of, or be formed from any fluid binder material described hereinabove in Section II. Further, an article described herein can comprise any combination of particulate material and binder material not inconsistent with the objectives of the present invention.

An article comprising a particulate material phase and a binder material phase described herein, in some embodiments, can exhibit one or more advantageous mechanical properties, including a high flexural strength. For example, in some cases, an article described herein, when cured, has a flexural strength at break greater than about 25 MPa. In some embodiments, an article described herein, when cured, has a flexural strength at break greater than about 35 MPa, greater than about 40 MPa, greater than about 45 MPa, greater than about 50 MPa, greater than about 55 MPa, greater than 60 MPa, greater than about 70 MPa, or greater than about 80 MPa. In some cases, an article described herein, when cured, has a flexural strength at break between about 25 MPa and about 80 MPa, between about 35 MPa and about 80 MPa, between about 40 MPa and about 70 MPa, between about 40 MPa and about 65 MPa, between about 50 MPa and about 80 MPa, or between about 50 MPa and about 70 MPa, between about 55 MPa and about 80 MPa, between about 55 MPa and about 70 MPa. Further, as described hereinabove, the mechanical properties of an article, including the flexural strength of the article, can be tuned or adjusted as desired based on one or more of (i) the presence or absence of a continuous binder material phase; (ii) the type of chemical bonding between particles of the particulate material phase; and (iii) the type of chemical bonding between particles of the particulate material phase and components of the binder material phase.

The three-point flexural strength of an article described herein can be measured with a Texture Analyzer TA-XT2i from Stable Micro System based in the United Kingdom as follows. A bar-shaped test part 5 mm thick, 5.7 mm wide, and 50 mm long is created by applying a fluid binder material onto a particulate material using a three-dimensional printer in a manner described herein, followed by curing of the test part. Specifically, test parts can be printed on a Spectrum Z® 510 three dimensional printer available from Z Corporation in Burlington, Mass. modified to use a SM-128 piezoelectric jetting assembly along with an Apollo II Printhead Support Kit, both available from FUJIFILM Dimatix based in Santa Clara, Calif. The test parts can be printed by applying the fluid binder material through the SM-128 jetting assembly over the particulate material at a layer thickness of 100 microns. Following printing of all of the layers, the test parts are allowed to solidify for 1 hour before extraction from the build bed of the Spectrum Z510 and placement in a 60° C. oven for 12 hours to cure. Next, the cured test part is supported on a two-point span spaced at a distance of 40 mm. The force required to break the test part when the force is applied at the center of the 40 mm span can then be used to calculate an estimate of the flexural strength. The distance to break the test part is also recorded and may be used to estimate the amount of strain the bar endures. Higher flexural distances at break, as the strength increases, may correspond to increased toughness of the article.

Some embodiments described herein are further illustrated in the following non-limiting examples.

EXAMPLES

Articles according to some embodiments described herein can be provided using the following materials, kits, and methods. Specifically, the insoluble fillers of Table II can be used in the formulations of Table I. In addition, the particulate materials of Table I and Table II can be used in combination with the binder material of Table III. It should also be noted that the weight percents in Table I is based on the total weight of the particulate material, and the weight percents in Table III are based on the total weight of the fluid binder. Particulate materials comprising the insoluble fillers 1-6 are consolidated with the fluid binder of Table III at least partially by reacting the surface ethyleneically unsaturated functional groups on the insoluble fillers with the (meth) acrylate groups of the multifunctional linker of the binder, as described hereinabove. In this manner, printed articles having a high modulus can be obtained. Particulate materials comprising the insoluble fillers 7-12 are consolidated with the fluid binder of Table III at least partially by reacting the surface vinyl or acrylate functional groups on the insoluble fillers with the (meth)acrylate groups of the multifunctional linker of the binder, as described hereinabove. In this manner, printed articles having improved impact strength can be obtained. Particulate materials comprising insoluble fillers 13 and 14 are consolidated by plasma treatment of the particulate material followed by addition of the fluid binder of Table III, as described further hereinabove.

TABLE I

Particulate Materials.

| | |
|---|---|
| insoluble filler | 50-90 wt % |
| soluble filler | 10-50 wt % |
| pigment | 0.0-5 wt % |
| transition metal catalyst | 0.01-1 wt % |
| processing aids | 0.01-2.0 weight % |

TABLE II

Insoluble Fillers.

| Number | Species |
|---|---|
| 1 | Core-shell particles formed from rubber particles coated with polymethyl(meth)acrylate (MW = 100,000-500,000) |
| 2 | Core-shell particles formed from rubber particles coated with polyethyl(meth)acrylate (MW = 100,000-500,000) |
| 3 | Core-shell particles formed from rubber particles coated with polybutyl(meth)acrylate (MW = 100,000-500,000) |
| 4 | Core-shell particles formed from ceramic particles coated with polymethyl(meth)acrylate (MW = 100,000-500,000) |
| 5 | Core-shell particles formed from ceramic particles coated with polyethyl(meth)acrylate (MW = 100,000-500,000) |
| 6 | Core-shell particles formed from ceramic particles coated with polybutyl(meth)acrylate (MW = 100,000-500,000) |
| 7 | Polymethyl(meth)acrylate particles (MW = 100,000-500,000) surface-functionalized with pendant acrylate groups |
| 8 | Polymethyl(meth)acrylate particles (MW = 100,000-500,000) surface-functionalized with pendant vinyl groups |
| 9 | Polyethyl(meth)acrylate particles (MW = 100,000-500,000) surface-functionalized with pendant acrylate groups |
| 10 | Polyethyl(meth)acrylate particles (MW = 100,000-500,000) surface-functionalized with pendant vinyl groups |
| 11 | Polybutyl(meth)acrylate particles (MW = 100,000-500,000) surface-functionalized with pendant acrylate groups |
| 12 | Polybutyl(meth)acrylate particles (MW = 100,000-500,000) surface-functionalized with pendant vinyl groups |
| 13 | Solid or hollow SiO$_2$ spheres |
| 14 | Solid or hollow metal spheres |

TABLE III

Fluid Binder.

| Component | wt. % |
|---|---|
| Dimethacrylate multifunctional linker | 57.50% |
| Monofunctional methacrylate | 30.00% |
| Allylic oligomer | 10.00% |
| di-tert-butyl-hydroquinone | 0.05% |
| BYK UV 3500 Surfactant | 0.05% |
| Arkema Luperox CU90 cumene hydroperoxide | 2.40% |

Various embodiments of the present invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A method of printing a three dimensional article comprising:
   providing a substantially dry particulate material including a plurality of adjacent particles, the particulate material comprising an insoluble filler and the surface of the particles comprising a first functional group; and
   applying a fluid binder material to at least some of the plurality of particles in an amount sufficient to bond the particles together to define a cross-sectional portion of the article, the fluid binder material comprising a single chemical species having both a second functional group and a third functional group that differs from the second functional group,
   wherein the insoluble filler is insoluble in the fluid binder material;
   wherein the second functional group chemically reacts with the first functional group to form a covalent bond between the particulate material and the fluid binder material; and
   wherein the third functional group self-cures.

2. The method of claim 1, wherein the particles are bonded together with chemical bonds having a bond strength of at least 10 kJ/mol.

3. The method of claim 1, wherein the first functional group comprises a vinyl, (meth)acrylate, hydroxyl, amine, or amide group.

4. The method of claim 1, wherein the first functional group comprises a carbon radical, singlet oxygen species, or peroxide.

5. The method of claim 1, wherein the second functional group comprises a glycidyl, epoxide, vinyl, or (meth)acrylate group.

6. The method of claim 1, wherein the first functional group comprises a hydroxyl, amine, or amide group, and the second functional group comprises a glycidyl or epoxide group.

7. The method of claim 1, wherein the first functional group comprises a carbon radical, singlet oxygen species, or peroxide, and the second functional group comprises a glycidyl, epoxide, vinyl, or (meth)acrylate group.

8. The method of claim 1 further comprising forming reactive sites on the surface of the particles.

9. The method of claim 8, wherein the reactive sites are formed by treating the particles with one or more of an electron beam, a plasma, and ozone.

10. The method of claim 8 further comprising reacting the reactive sites on the surface of the particles with one or more chemical species comprising the first functional group to provide functionalized particles comprising the first functional group.

11. The method of claim 8, wherein the reactive sites are formed prior to applying the fluid binder material to the particles.

12. The method of claim 8, wherein the reactive sites are formed substantially simultaneously with applying the fluid binder material to the particles.

13. The method of claim 1, wherein less than 15% by weight fluid binder material is used, based on the total weight of the fluid binder material and the particulate material.

14. The method of claim 1, wherein the second and/or third functional group is a (meth)acrylate.

15. The method of claim 1, wherein the chemical species of the fluid binder material comprises a di(meth)acrylate.

* * * * *